Figure 1:
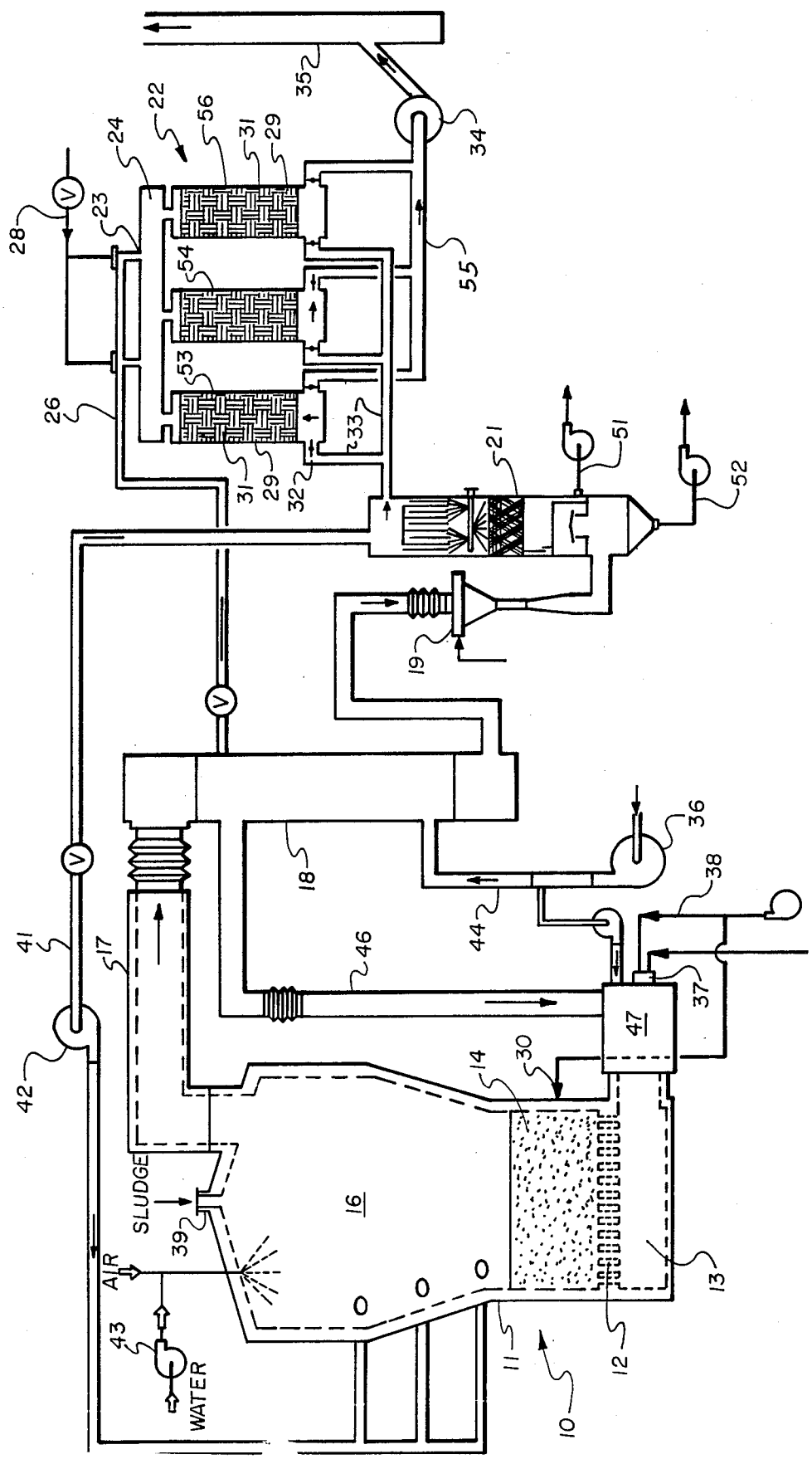

United States Patent [19]

Albertson et al.

[11] Patent Number: 4,917,027

[45] Date of Patent: Apr. 17, 1990

[54] SLUDGE INCINERATION IN SINGLE STAGE COMBUSTOR WITH GAS SCRUBBING FOLLOWED BY AFTERBURNING AND HEAT RECOVERY

[76] Inventors: Orris E. Albertson, 1915 Wasatch Dr., Salt Lake City, Utah 84108; Allen Baturay, 4005 Aldie Rd., Catharpen, Va. 22018

[21] Appl. No.: 335,231

[22] Filed: Apr. 10, 1989

Related U.S. Application Data

[63] Continuation-in-part of Ser. No. 219,721, Jul. 15, 1988, Pat. No. 4,901,654.

[51] Int. Cl.⁴ .............................................. F23G 5/00
[52] U.S. Cl. .................................... 110/346; 110/215; 110/216; 110/245
[58] Field of Search ............... 110/245, 238, 211, 210, 110/212, 215, 216, 346; 422/183

[56] References Cited

U.S. PATENT DOCUMENTS

| | | | |
|---|---|---|---|
| 2,655,883 | 10/1953 | Martin | 110/215 |
| 3,716,339 | 2/1973 | Shigaki et al. | 110/215 |
| 3,884,162 | 5/1975 | Schuster | 110/216 |
| 4,245,571 | 1/1981 | Przewalski | 110/212 |
| 4,388,875 | 6/1983 | Hirose | 110/238 |
| 4,676,177 | 6/1987 | Engstrom | 110/245 |

Primary Examiner—Edward G. Favors
Assistant Examiner—Denise L. Ferensic
Attorney, Agent, or Firm—Robert R. Finch

[57] ABSTRACT

A method for sludge disposal in a single compartment furnace in which fouling of the apparatus by low melting eutectics and/or the release to the atmosphere of heavy metal fumes is avoided by limiting the temperature in the combustion bed and in the overlying freeboard to be below the eutectic melting or heavy metal fuming point then immediately cooling and scrubbing the gases and only thereafter subjecting the resulting scrubbed and cooled gases to high temperature afterburning carried out with appropriate heat exchange functions. Apparatus is also disclosed for carrying out the method in a fluidized bed reactor.

11 Claims, 1 Drawing Sheet

SLUDGE INCINERATION IN SINGLE STAGE COMBUSTOR WITH GAS SCRUBBING FOLLOWED BY AFTERBURNING AND HEAT RECOVERY

This invention relates generally to the disposal by incineration of waste organic sludge along with removal of resulting ash and cleansing of gases derived from incineration to qualify such gases for release to the atmosphere. In particular, it relates to sludge disposal in a system employing a single stage combustion unit such as a fluidized bed reactor, co-current rotary kiln, grate type furnace, waste boiler or an oven.

This is a continuation-in-part of our earlier filed co-pending application Ser. No. 07/219,721 filed July 15, 1988, now U.S. Pat. No. 4,901,654 and entitled Deodorization and Cleaning of Medium Temperature Wet Off-Gases Derived From Burning Wet Waste Sludge.

Incineration of waste sludges is a major activity throughout the world. Typical schemes utilize furnaces to burn the sludge to yield ash and gases. Afterburners are employed to burn the gases to destroy residual organic and/or other impurities prior to gas scrubbing for removal of particulates and condensibles.

There are two basic type furnaces. One is a counter-flow furnace such as a rotary kiln or multiple hearth furnace through which the incoming sludge passes counter-currently to the combustion gases. Another basic type is a single stage unit wherein a more or less homogeneous mass is burned in-situ with gases flowing therethrough. Fluid bed reactors, co-current rotary kilns, single grate combustors and waste boilers are typical.

A fluid bed furnace comprises a single refractory lined chamber wherein a bed of finely-divided, thermally inert material such as silica sand, alumina or ceramic material, is supported on a perforated steel or refractory plate that overlies a plenum. Combustion and fluidizing air introduced into the plenum flows upwardly through the plate and bed. This expands the bed by as much as 30% to 60% of its volume and "fluidizes" it so that it is highly agitated and behaves like boiling liquid. Such a bed has remarkable temperature homogeneity and high thermal density. The fluidizing gas required will vary with bed material, but will usually be of volume to cause the upward gas flow or space rate to be in the range from 2–4 fps. Space rate is measured as if flowing through an empty vessel of the same cross sectional area as the bed.

In the current practice of fluid bed sludge incineration, the fluid bed is initially heated by fuel addition to about 1300° F.–1500° F. Thereafter, the bed temperature is maintained at sludge combustion level by burning therein waste sludge which is fed onto the top of the bed or injected into submergence therein. An automatic fuel supply system is used to maintain the bed at minimum combustion temperature when the sludge does not sustain the combustion temperature. Gases leaving the bed contain some combustible organics that burn in the freeboard, thus normally establishing and maintaining a freeboard temperature about 200° F.–300° F. above the bed temperature.

Control of excessive bed and/or freeboard temperature is accomplished by water spray and/or wet gas or air. All ash and other gas-entrained particulates leave the furnace in the exiting gas stream.

Typically, in fluidized furnace operation, the exit gas stream is used first in indirect heat exchange to preheat incoming fluidizing combustion air then is scrubbed, cooled and cleaned, as by venturi scrubber-coolers and/or electrostatic precipitators for release to the atmosphere.

Although fluidized bed combustion units have been very successful, they do suffer from deficiencies in certain situations where the sludge contains certain waste material components comprising heavy metals or low melting eutectics, the presence of which limits the furnace operation to a temperature below that required for final gas purification. This is an increasingly troublesome problem because new regulatory criteria frequently require combustion temperatures of 1600° F.–1800° F. In fact, the required temperature may be as high as 2300° F. if thermally resistant organics, such as dioxin, deldrin, PCB, etc., are present.

Low melting eutectics, such as sodium or potassium carbonate, can cause a fluid bed to set up or freeze or, if it melts while entrained in the hot exit gas, the eutectic will slag or foul the furnace walls, ductwork and heat exchanger components. This problem can be overcome by operating the bed and freeboard below the ash melting point, as is done in black liquor combustors in the pulp and paper industry. Black liquor combustors operate at 1300° F.–1350° F., but they are unable to completely oxidize the exhaust gases.

Heavy metals, such as cadmium, chromium, copper, lead and zinc, will start to fume at temperatures of about 1300° F.; and fuming will become substantial at temperatures above 1400° F.–1500° F. Fuming will occur at elevated temperatures whether the metals are in the bed or gas-entrained in the freeboard. Once the metals have fumed (vaporized), they are very difficult to remove from the gas stream. If not removed, they will be released to the atmosphere which is prohibited by federal and local air pollution codes.

In summary, there are oases where conditions of a situation work against a single compartment furnace. A typical scenario is when the sludge contains fumeable heavy metals or eutectic compounds, such as sodium or potassium carbonate, that become sticky and render a bed inoperative, while, at the same time, the local regulations establish standards that can only be met at high gas burning temperatures ranging from 1700° F. to above 2300° F. Such high temperatures inevitably cause fuming of entrained heavy metals or slagging due to eutectics. In such cases, the eutectics may cause the bed to be inoperative or the system walls to scale. Discharge of heavy metal fumes to system components or release to the atmosphere will likely result in shut down of the facility by the authorities.

It is the primary object of this invention to provide ways and means for sludge disposal employing a single stage furnace and a gas cleaning system which avoids fuming of heavy metals and/or slagging of eutectics while enabling high temperature afterburning of gases, thus to permit use of the easy-to-operate single stage furnaces for sludge disposal while still meeting high quality criteria for gases discharged from the system.

A further object is provision of a system and method of operating the same in which recovery of heat at the afterburner is maximized and total system fuel consumption is minimized.

Another object is provision of a system and method of operation wherein heavy metals and eutectics are removed from the gas before the latter is subjected to afterburning at the required high temperatures.

An important related object is provision of ways and means enabling existing single stage furnace systems to operate under conditions whereby eutectic slagging and/or fuming of heavy metals are avoided, yet gas burning is carried out at high temperatures as needed to meet all existing gas quality standards.

The foregoing and probably other objects of the invention are attained by a system employing, in combination, a single compartment furnace of the type in which a sludge incineration zone is overlain by a freeboard wherein gas for combustion passes upwardly through the incineration zone to and through the freeboard, means are provided for controlling temperatures in the incineration zone and the freeboard, gas conditioning means are provided to scrub and cool gases exiting the freeboard to remove therefrom particulates, moisture and inorganic and organic condensibles, and there is provided an afterburner to burn the resulting conditioned gases at temperatures as required for final gas purification to meet emission standards.

This invention is predicated on the discovery that by maintaining the single combustion bed and overlying freeboard below the temperature at which undesirable fuming of heavy metals occurs and/or at which fusing or slagging of eutectics occurs, then immediately cooling and scrubbing the resulting dirty gases to remove condensibles and entrained particulates, including the heavy metals and eutectics, a conditioned gas is obtained that may be burned in an afterburner at any foreseeable elevated temperature, including 2300° F. or more, to yield a dry, clean gas which, after cooling to recover heat, may be released to the atmosphere.

When eutectics or heavy metals are present, it is important to keep the bed temperature as low as necessary to prevent slagging and/or fuming, but sufficiently high that the majority of heat release occurs in the initial combustion stage to sustain combustion temperature with minimum fuel input.

Operating the bed at a relatively low temperature will result in dirty combustion gases containing a higher content of volatile combustibles, entrained particles of heavy metals and residual ash. Since the entrained heavy metals will fume in the freeboard at some temperatures above the bed temperatures, it is necessary to keep the freeboard at or below the the temperature at which fuming occurs. This means that the freeboard temperature must be kept near or even below the bed temperature. This is done by use of a cooling medium, such as water, moist gases, air or indirect heat exchange means. The entrained material and condensibles are removed from the gases by cooling and scrubbing to yield a dry gas stream at about 80° F.-120° F. which has been specifically conditioned to be thereafter reheated and subjected to afterburning at higher temperatures.

In our above identified earlier application we disclose and claim ways and means for the improved operation of multiple stage furnaces coupled with gas afterburner temperatures up to 2300° F. or higher. In such operation, the furnace is operated to yield only a medium temperature, wet, dirty off-gas which is immediately cooled and scrubbed and only thereafter reheated by burning in an afterburner for higher temperature gas cleansing. Operating as described, $NO_x$ formation is minimized as is fuming of heavy metals because the offending materials are entrained then removed by scrubbing without oxidation or fuming. In the above described improved system, the scrubbed and cooled gases enable use of high efficiency heat exchangers to recover heat in the afterburners, and the overall fuel consumption of the entire system is dramatically reduced.

The present invention utilizes the teachings of our earlier application by the expedient of deliberately operating the single combustion bed and the overlying freeboard at a temperature that is lower than normal for efficient incineration of that sludge in accordance with prior practice. This will yield dirtier gases than usual but will discourage $NO_x$ formation, fuming of heavy metals or melting of eutectics even though such materials may be entrained in the uprising gases. According to this invention, gases from the furnace, before being subjected to higher temperature afterburning, are first scrubbed and cooled to yield conditioned gases that have been cleansed of particulates and cooled to the approximate range of 80° F.-120° F. Only after such scrubbing and cooling are the gases finally cleansed by afterburning at elevated temperatures as needed to meet emission standards. Since the gases have been scrubbed they may be afterburned in a system associated with high efficiency heat exchangers, such as regenerative exchangers, after which the gases are released to the atmosphere. The afterburners may be operated at whatever elevated temperature is needed to meet the existing standards. At present, some municipalities have standards requiring afterburner temperatures of 1600° F.-1800° F. Future standards are almost certain to be even more stringent. However, this invention can accomodate all such higher temperatures, because the initial cooling and scrubbing will remove materials that become offensive at high temperatures. This invention is applicable to combusting refractory organics such as PCBs, dioxins, etc., which may require temperatures in excess of 2300° F. for burning.

Briefly, according to the present invention, the single combustion zone and associated overlying freeboard are operated at a temperature to avoid melting of eutectics, such as sodium and potassium carbonates and/or fuming of heavy metals. Optimum temperature control is effected by feeding wet sludge through the freeboard to fall onto the bed. Further regulation of temperature and $NO_x$ production may be effected by an automatically controlled injection of a cooling medium into the freeboard and careful control of the supply of fluidizing combustion air to the bed. With these measures, the bed and freeboard are operated at about the same temperature; and the gases are scrubbed and cooled to remove particulates and condensibles before afterburning.

In accordance with this invention, the fluidized bed will be maintained at a temperature sufficiently high to sustain sludge combustion yet below the melting point of eutectics and below the temperature at which heavy metals fume or objectionable $NO_x$ forms. In general, this means that the bed should be in the low end of a 1200° F.-1400° F. range. For example, in the previously mentioned black liquor combustion, it is necessary to operate the fluid bed reactor at a bed temperature of 1200° F.-1300° F., but maintain the freeboard temperature at 1100° F.-1200° F. In contrast most existing municipal sludge furnaces will operate at temperatures of 1300° F.-1400° F. in the bed and 1550° F.-1650° F. in the freeboard.

In addition to bed temperature control, this invention also requires that the freeboard temperature be controlled to avoid the occurrence therein of eutectic melting, heavy metal fuming and/or $NO_x$ formation. This is an important requirement because if freeboard temperature control is not exercised, burning of the gas-borne combustible materials will heat the freeboard gas to at least about above the bed temperature. This will result in the same eutectic melting, heavy metal fuming and $NO_x$ formation that the lower bed temperature sought to control. In general, satisfactory freeboard temperature control is obtained by maintaining the freeboard temperature in the broad range of from about 150° F. below to about 150° F. above the bed temperature.

In order that the invention may be more readily understood and carried into effect, reference is made to the accompanying drawing and description thereof which are offered by way of example only and not in limitation of the invention the scope of which is defined by the appended claims and equivalents embraced therein rather than by any mere description.

FIG. 1 illustrates a system with a fluidized bed reactor furnace and embodying the invention.

The furnace is a fluid bed reactor 10 comprising a housing 11 with a transverse perforated hearth 12 dividing the housing into an upper combustion zone and a bottom plenum or windbox 13. A bed 14 of sand or other inert material is supported on the hearth 12 and is overlain by a freeboard 16 through which uprising gases flow to exit via an outlet conduit 17 whence to pass downwardly through an indirect heat exchanger 18 then sequentially to and through venturi scrubber-cooler assembly 19 and an electrostatic precipitator 21; and finally, to a gas afterburner-heat recovery station 22 wherein the cool conditioned gas is reheated and burned at temperatures up to 2300° F. or above, as needed to clean the gas and effect heat recovery. The resulting clean, relatively cool gas is then discharged to the atmosphere.

Gas discharged from the precipitator is cool, relatively dry and free from condensibles and entrained particulates. This comprises the gas fed to the afterburner for reheating and burning.

The afterburner and heat recovery station includes suitable burners 23 in a plenum 24 to which combustion air is supplied via a conduit 26 while secondary fuel is delivered via a suitable valved conduit 28. Heat is recovered in high efficiency regenerative type heat exchangers 29 which are typically equipped with ceramic elements 31, and appropriate valves and conduits 32 and 33. Final gas release to atmosphere is effected by a fan 34 and stack 35.

It is significant that the use of high efficiency recuperative or regenerative heat exchangers in the afterburner station is still enabled by practice of this invention wherein the gases from the combustion bed are cooled and scrubbed before any gas afterburning is conducted. The lower temperature in the furnace coupled with the cooling and scrubbing protects against the presence in the gases of damaging eutectics, oxidizable nitrogen and heavy metals subject to fuming.

For initial operation, fluidizing air from pump 36, after preheating in exchanger 18, enters the plenum and passes upwardly through the bed. Preheating is accomplished by means of burner 37 and fuel conduit 38 until the bed is hot enough to support drying and combustion of sludge admitted through the inlet 39 at the top of the furnace. Fuel, as and if needed, is automatically fed to the bed at 30 to maintain minimum temperatures therein. The moisture content and consistency of the sludge assist in temperature control in both the bed and freeboard. Additional control is effected by recycling cooled gas from the wet precipitator via a suitable valved conduit 41 and pump 42. Water, if needed, may be injected into the freeboard by a pump and nozzle assembly 43.

The bulk of the fluidizing air from the pump 36 is directed via conduit 44 to the heat exchanger 18 where it is preheated by indirect exchange with the 1100° F.-1400° F. gas from the outlet 17. The preheated gases are then conducted via conduit 46 to the inlet chamber 47 preceding the plenum 13.

The precooled gases from the first heat exchanger are at a temperature in the range of 500° F.-1200° F. and flow successively through the venturi scrubber 19 and the wet electrostatic precipitator 21 whence they exit at about 80° F.-120° F. to flow primarily via conduit 33 and valves 32 to the afterburner.

A slurry of ash in scrubber water discharges from the precipitator at appropriate outlets 51 and 52.

Cooled gases flow alternately up and down through the heat exchangers. First, gases flow up through one exchanger 53 then to the afterburner plenum 24 where they are burned and reach high temperatures, say from 1700° F. to above 2000° F. The resulting hot gases flow downwardly from the burner through a second exchanger 54 where they are cooled to 200° F.-350° F., then flow into a manifold 55 thence through the fan 34 to stack 35. Once the elements of an exchanger are heated to a pre-selected high temperature by downflow of hot gas, the valving changes to direct cold gas from the wet precipitator upwardly through the hot exchanger elements. At the same time, the valves shift to direct hot gas from the afterburner 24 downwardly through the cooled elements of another exchanger. Normally, only two exchangers 53 and 54 are in service at one time while the other, 56, is in reserve. Thus, cool gas may flow up through exchanger 53, where it is preheated through the afterburner 24, where it is heated further, then down through a cool exchanger 54. This continues until exchanger 53 is cooled and exchanger 54 is heated. The flow is then reversed. This procedure effects considerable fuel economy especially with high efficiency heat exchangers. Normally, the regenerative heat exchangers can recover as much as 90%-95% of the heat input while recuperative heat exchangers will recover up to 80%-85% . The resulting gas, which is dry and relatively cool (200° F.-350° F.), may be discharged to the atmosphere without producing a plume.

From the foregoing it is evident that the present invention has application to those cases where the waste sludge to be incinerated contains certain waste material, such as low melting eutectic compounds or fumeable heavy metals, which become objectionable, as by melting or fuming, at the temperatures at which said sludge could, except for the presence of said certain waste materials, be incinerated in a single combustion mass and the resulting gases afterburned in an immediately overlying freeboard.

The specification refers and contemplates the use of automated systems for temperature control by regulated fuel addition, gas recycle, water injection, heat exchange sequencing, etc, but detailed descriptions thereof are omitted as they are unnecessary. Obviously, any suitable controls may be chosen from among those readily available.

The following claims define that on which we seek a patent.

We claim:

1. The method for disposal of waste organic sludge of the type which contains at least one certain waste material that is either a low melting eutectic that softens or heavy metal that fumes at the highest temperature required to effect incineration of said sludge and cleansing by burning of the resultant gases; comprising the steps of combusting said sludge in a single combustion mass overlain by a gas-filled freeboard thereby to effect burning of substantially the entire content of combustible solids while yielding wet gases which contain entrained particulates as well as combustible and non-combustible constituents, volatiles and condensible matter; maintaining said combustion mass and said overlying freeboard at temperatures below that at which said certain waste material softens or fumes; discharging gases from said freeboard; scrubbing and cooling said gases to yield conditioned gases in the temperature range from 80° F.–120° F.; reheating said conditioned gases to temperatures required to cleanse the same by burning thereby to yield hot clean gases; and cooling said hot clean gases and discharging the same to atmosphere.

2. The method according to claim 1 in which the temperatures of said combustion mass and said freeboard are maintained in the range from 1200° F. to 1400° F., and said conditioned gases are heated to and burned at temperatures above about 1400° F. and above the temperature at which said certain waste materials soften or fume.

3. The method according to claim 1 in which said certain waste material comprises a non-combustible low-melting eutectic compound which softens and at temperatures above about 1350° F. and the temperature of both said combustion mass and said freeboard are maintained below the temperature at which said certain waste material softens.

4. The method according to claim 3 wherein the temperature of said combustion mass is maintained by regulating the rate of fuel, sludge combustion air and moisture supplied thereto; and the temperature in said freeboard is limited by spraying water thereto.

5. The method according to claim 3 in which cooler gases are injected into said freeboard to assist in temperature control therein.

6. The method according to claim 3 in which said certain waste material comprises at least one heavy metal selected from a class consisting of metals which fume at a temperature below the temperature required to effect complete sludge combustion in said combustion mass and burning of gases in said freeboard; and said temperatures in said combustion mass and said freeboard are maintained below said temperature at which said heavy metal fumes.

7. The invention according to claim 6 in which the temperature in said combustion mass is controlled by regulating the rate of addition thereto of sludge, moisture, combustion air and auxiliary fuel.

8. The invention according to claim 6 in which the temperature in said freeboard is limited by the injection thereinto of water.

9. The method according to claim 8 in which at least part of the temperature limitation in the freeboard is effected by injection thereinto of conditioned relatively cool gases derived from scrubbing and cooling of gases discharged from said freeboard.

10. An apparatus for the single stage incineration of waste organic sludge and disposal of resulting gases by burning which apparatus includes a furnace with a single combustion bed overlain by a gas-filled freeboard and in which sludge is burned in the combustion bed and gases are subjected to afterburning in the freeboard; a pre-heater in which gases discharged from the freeboard preheat combustion air entering the furnace; and a gas scrubber and cooler located to receive gases from the preheater and from which scrubbed-cooled gases are released to the atmosphere; the improvement enabling said apparatus to effect incineration of sludge containing low melting eutectic materials and/or fumeable undesirable heavy metals, which improvement comprises temperature control means for limiting temperatures in said combustion bed and said overlying freeboard to be below the melting temperature of any significant eutectic content of sludge burned in said combustion bed as well as below the fuming temperature of any undesirable heavy metals in said sludge; a gas afterburning means comprising an afterburner combustion chamber with suitable fuel supply and fuel burners; a first conduit connecting the outlet of said gas scrubber and cooler with the interior of said afterburner combustion chamber; a second conduit for conducting gas from said afterburner combustion chamber for eventual release to atmosphere; and heat exchange means associated with said first and second conduits for preheating scrubbed and cooled gases ahead of said afterburner combustion chamber and for cooling the gases conducted from said afterburner combustion chamber by said second conduit before release of said gases to the atmosphere.

11. Apparatus according to claim 10 in which said furnace comprises a single bed fluid bed reactor, and said means for limiting the temperature in said freeboard and said bed include a nozzle positioned to selectively inject water and/or gas into said freeboard and/or said combustion bed.

* * * * *